(12) United States Patent
Thomas

(10) Patent No.: US 6,427,727 B1
(45) Date of Patent: Aug. 6, 2002

(54) FLEXIBLE HOSE LENGTH CONTROL SYSTEM, EXHAUST SYSTEM APPLICATION, AND MANUFACTURING METHOD

(75) Inventor: R. Winfield Thomas, West Lebanon, IN (US)

(73) Assignee: Tru-Flex Metal Hose Corporation, West Lebanon, IN (US)

( * ) Notice: Subject to any disclaimer, the term of this patent is extended or adjusted under 35 U.S.C. 154(b) by 0 days.

(21) Appl. No.: 09/557,742

(22) Filed: Apr. 25, 2000

Related U.S. Application Data

(63) Continuation-in-part of application No. 09/138,215, filed on Aug. 21, 1998, now Pat. No. 6,053,212.

(51) Int. Cl.[7] ............................................... F16L 11/16
(52) U.S. Cl. ...................... 138/106; 138/119; 138/129; 138/135; 138/136; 138/154; 138/122
(58) Field of Search ................................ 138/104, 106, 138/119, 135, 136, 154, 122, 129

(56) References Cited

U.S. PATENT DOCUMENTS

| | | | | |
|---|---|---|---|---|
| 976,987 A | * | 11/1910 | Corbridge | ................... 138/106 |
| 1,371,981 A | * | 3/1921 | Rose | ........................... 138/122 |
| 1,913,390 A | * | 6/1933 | Hungerford | .................. 138/135 |
| 2,401,949 A | | 6/1946 | Mariner | .................. 138/135 X |
| 3,006,662 A | * | 10/1961 | Katsuhara | .................... 138/106 |
| 3,311,133 A | | 3/1967 | Kinander | ................. 138/135 X |
| 4,197,728 A | | 4/1980 | McGowen | .............. 138/135 X |
| 5,182,954 A | * | 2/1993 | Menheere | .................... 138/104 |
| 5,362,113 A | | 11/1994 | Thomas | .................. 138/135 X |
| 5,769,127 A | * | 6/1998 | Kanao et al. | ................ 138/154 |
| 6,053,212 A | * | 4/2000 | Thomas | ....................... 138/135 |

* cited by examiner

*Primary Examiner*—James Hook
(74) *Attorney, Agent, or Firm*—Shughart Thomson & Kilroy P.C.

(57) ABSTRACT

A length-controlled flexible hose includes a body formed by spiral-winding a continuous metal band with interlocked leading and trailing edges. A length control adhesive strip is applied to the flexible hose along a surface thereof and minimizes length changes of the flexible hose whereby a design or engineered length can be maintained. A method of manufacturing a length-control flexible hose includes the steps of spiral-winding a continuous metal band, interlocking leading and trailing edges thereof and applying a length control adhesive strip to a surface thereof.

11 Claims, 7 Drawing Sheets

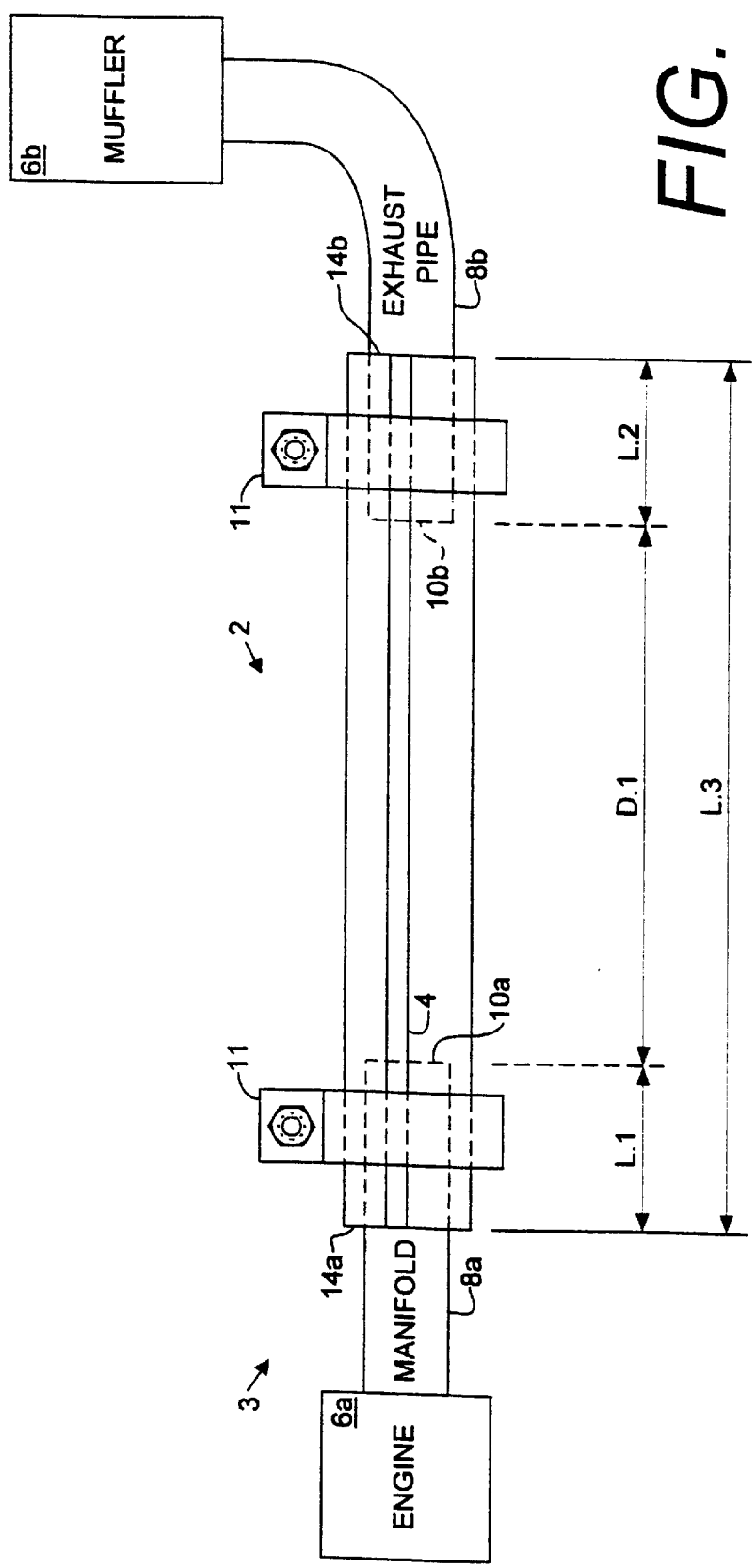

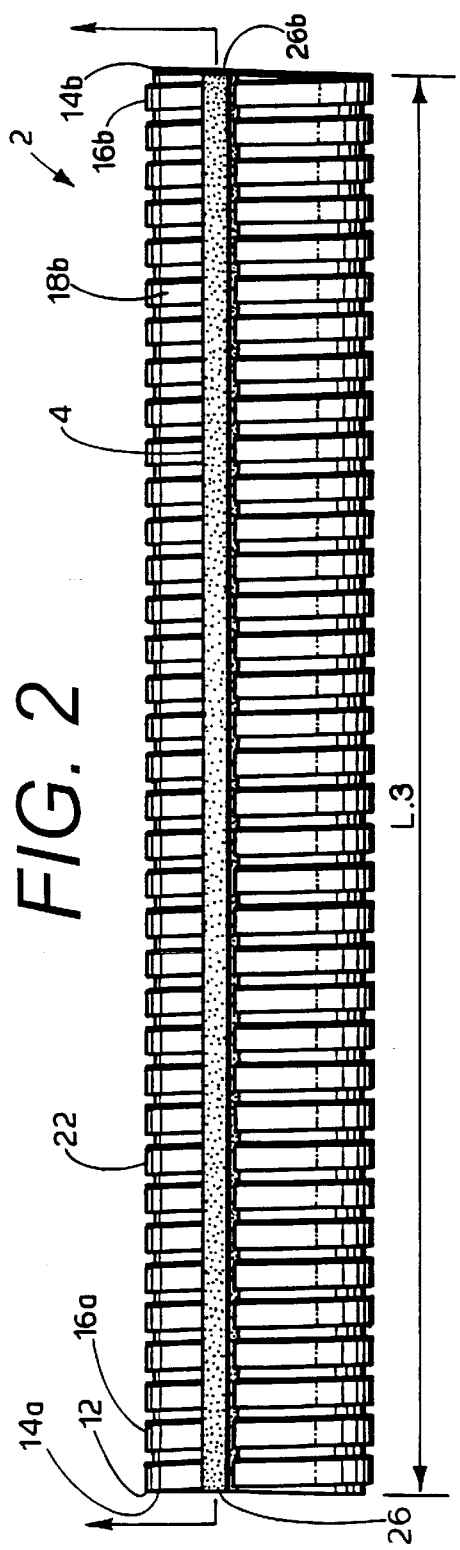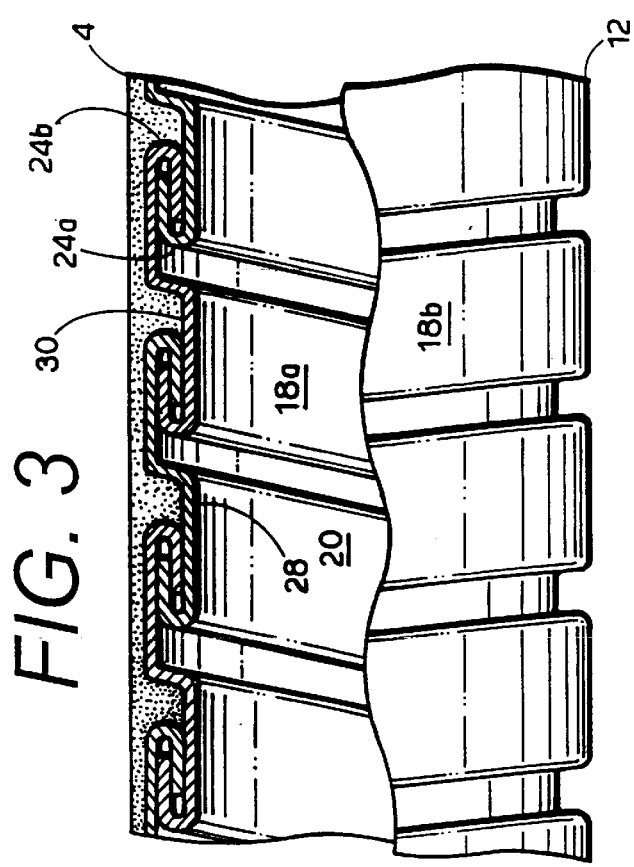

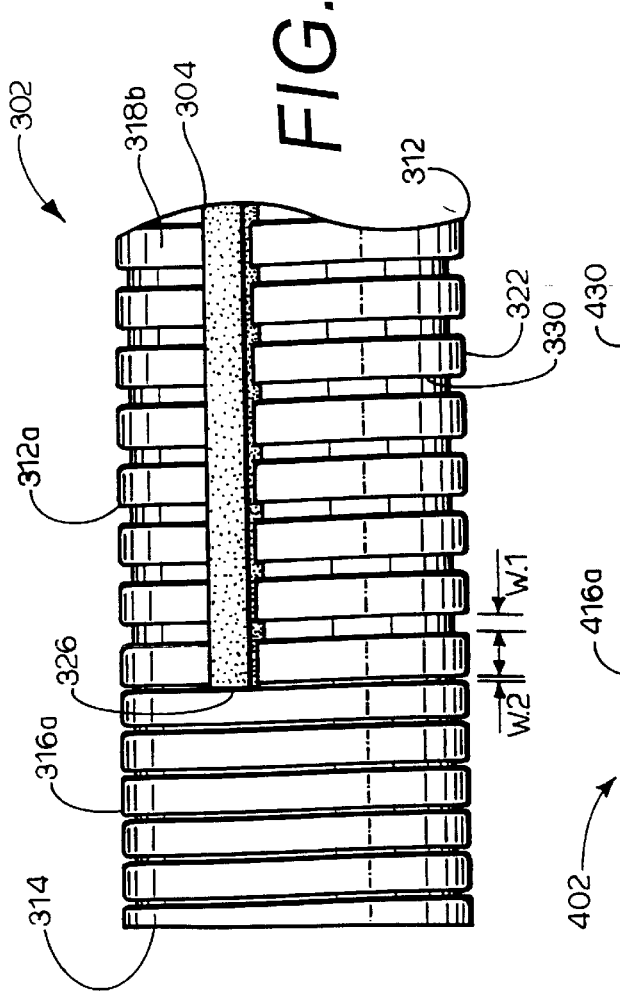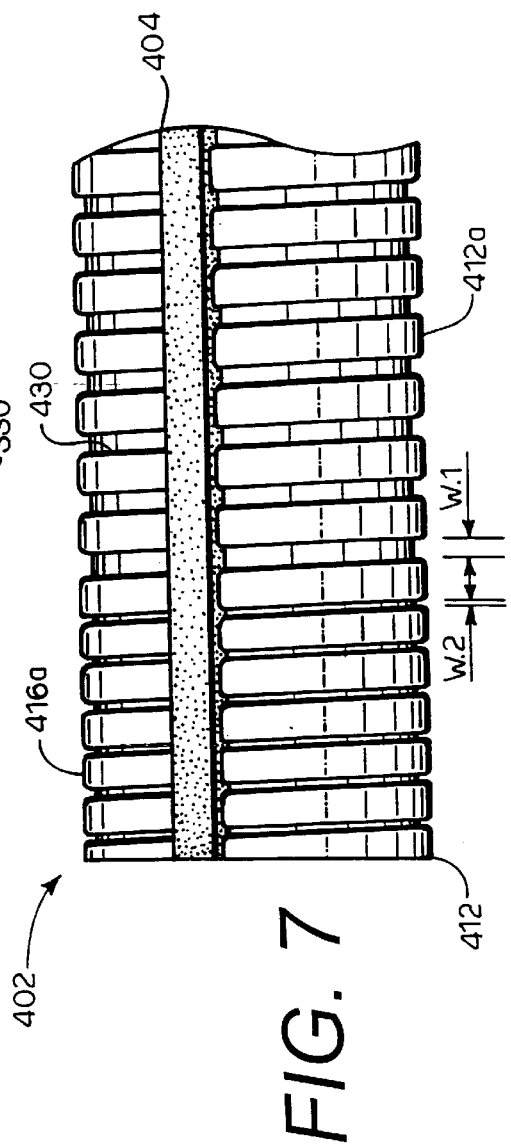

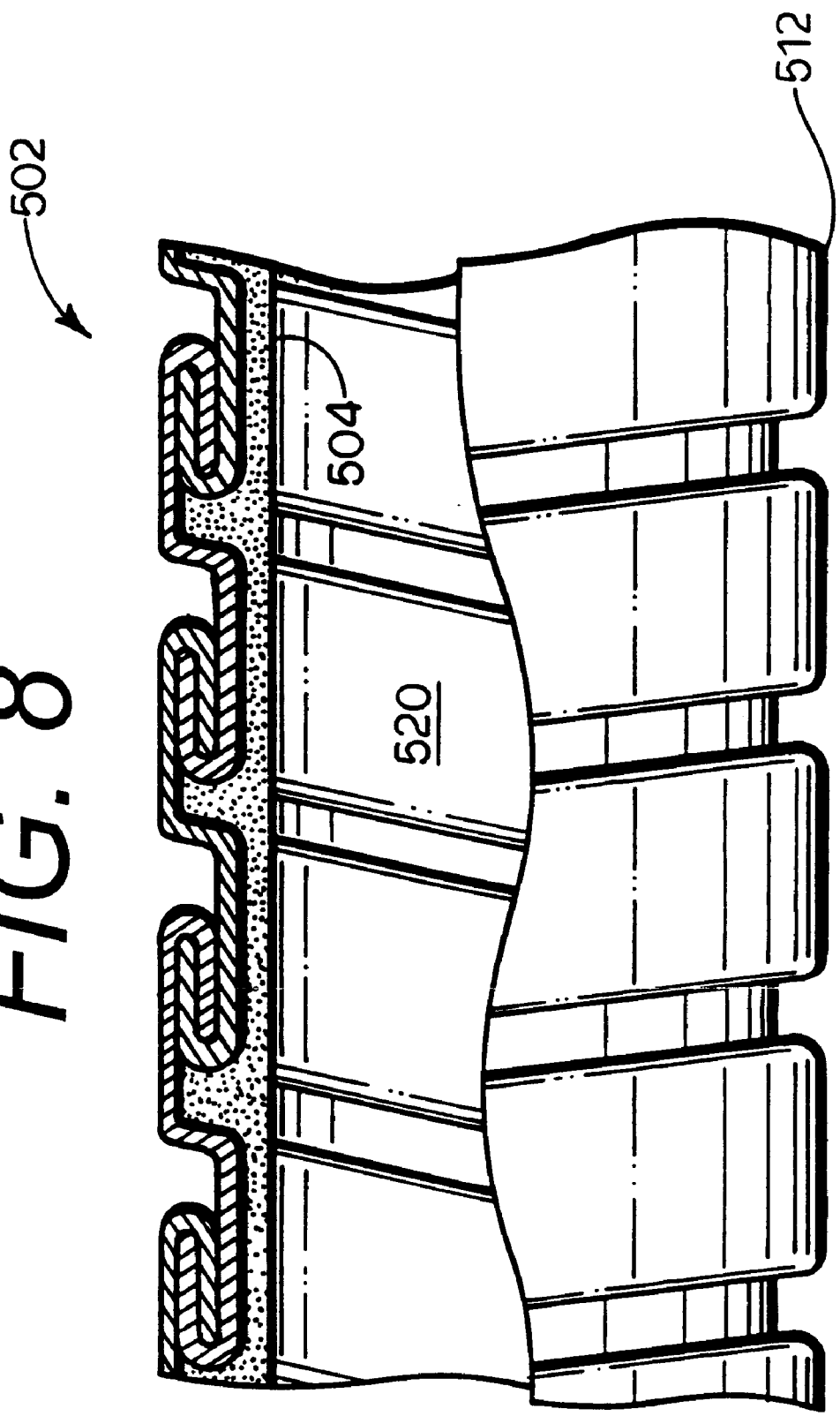

FLEXIBLE HOSE LENGTH CONTROL SYSTEM, EXHAUST SYSTEM APPLICATION, AND MANUFACTURING METHOD

CROSS REFERENCE TO RELATED APPLICATION

This application is a Continuation-in-Part of U.S. patent application Ser. No. 09/138,215, filed Aug. 21, 1998, now U.S. Pat. No. 6,053,212, issued Apr. 25, 2000, which application is incorporated herein by reference.

BACKGROUND OF THE INVENTION

1. Field of the Invention

The present invention relates generally to flexible hoses, and in particular to a flexible hose with a length control adhesive strip.

2. Description of the Prior Art

Flexible hoses are well known and various configurations have been devised for particular applications. A common type of flexible metal hose is formed by spiral-winding a continuous metal band and interlocking the leading and trailing edges thereof Such a manufacturing process is disclosed in the McGowen U.S. Pat. No. 4,197,728.

A common application of flexible metal hose is in vehicle exhaust systems, particularly where the hose is subjected to vibration, thermal stress and relative movement between the components connected thereby. For example, in the exhaust systems of tractor units of tractor trailer rigs an exhaust manifold is typically connected to an exhaust pipe by a flexible connection to absorb some of the relative movement and vibration referred to above. Such systems are typically designed with relatively precise design or engineered lengths. Manufacturing techniques exist for producing flexible hoses with such predetermined design engineered lengths. For example, the flexible hose can either be stretched or compressed as necessary. A predetermined design length specification can be met by winding the flexible hose relatively tightly. However, overly tight windings tend to greatly restrict flexibility, and can lead to premature wear and failure due to the inability of the windings to shift relative to each other.

Accordingly, there is a need for a flexible hose construction with a length control feature. Heretofore, there has not been available a length-controlled flexible hose and method of manufacturing same with the advantages and the features of the present invention.

SUMMARY OF THE INVENTION

In the practice of the present invention, a flexible hose is provided for connecting the components in, for example, an exhaust system. The flexible hose includes first and second ends and first and second end sections located adjacent to the ends. A medial section of the flexible hose is located between the end sections. The flexible hose is formed by spiral-winding a continuous metal band with interlocked leading and trailing edges. Helical channels are formed between the interlocked band edges and are open at inner and outer surfaces of the flexible hose. The interlocked leading and trailing edges accommodate a limited amount of movement whereby flexibility is provided with the hose. The length of the hose is controlled by placing one or more length control adhesive strips along one or both of the flexible hose surfaces. Each length control strip forms spacers located within a channel along one surface of the hose. The spacers maintain a predetermined spacing of a channel along a respective flexible hose surface and thus maintain a design or engineered length of the flexible hose, which can be determined, for example, by the spacing of the exhaust system components which it connects. A length control adhesive strip can assume different configurations on a surface of the flexible hose. In the practice of the method of the present invention, a design length for the flexible hose is determined in relation to the spacing of components which it connects. A metal band is spiral wound and produces a flexible hose with helical channels open at surfaces thereof A length control adhesive strip is applied to the flexible hose and forms spacers within a channel thereof, which maintain the engineered or design length of the hose.

OBJECTS AND ADVANTAGES OF THE INVENTION

The objects and advantages of the present invention include: providing a flexible metal hose with a length control adhesive strip; providing such a flexible hose which maintains a predetermined, design or engineered length in shipping, handling and installation; providing such a flexible hose which facilitates the installation process; providing such a flexible hose which can maintain a predetermined length relative to an exhaust system in which it is installed; providing such a flexible hose which can be manufactured with existing or readily available equipment, providing such a flexible hose which can accommodate various numbers and configurations of length control adhesive strips; providing a method of manufacturing a flexible metal hose which produces a length-controlled flexible hose; providing such a method which accommodates a wide variety of applications; and providing a length-controlled flexible hose and method of manufacturing same which are efficient in operation, economical and particularly well adapted for the proposed uses thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof

BRIEF DESCRIPTION OF THE DRAWINGS

FIG. 1 is a schematic diagram of an exhaust system with components thereof connected by a length-controlled flexible metal hose embodying the present invention.

FIG. 2 is a side elevational view of the length-controlled flexible metal hose.

FIG. 3 is an enlarged, fragmentary, side elevational view of the flexible hose with portions broken away to reveal internal construction.

FIG. 6 is a fragmentary, side elevational view of a length-controlled flexible metal hose comprising a third modified embodiment of the present invention with a length-adjustable end section.

FIG. 7 is a fragmentary, side elevational view of a length-controlled flexible metal hose comprising a fourth modified embodiment of the present invention with the hose having a compressed end section.

FIG. 8 is a fragmentary, side elevational view of a length-controlled flexible metal hose comprising a fifth modified embodiment of the present invention and including an adhesive, length-control strip mounted on the inside of a bore thereof

DETAILED DESCRIPTION OF THE PREFERRED EMBODIMENT

Figure 4:
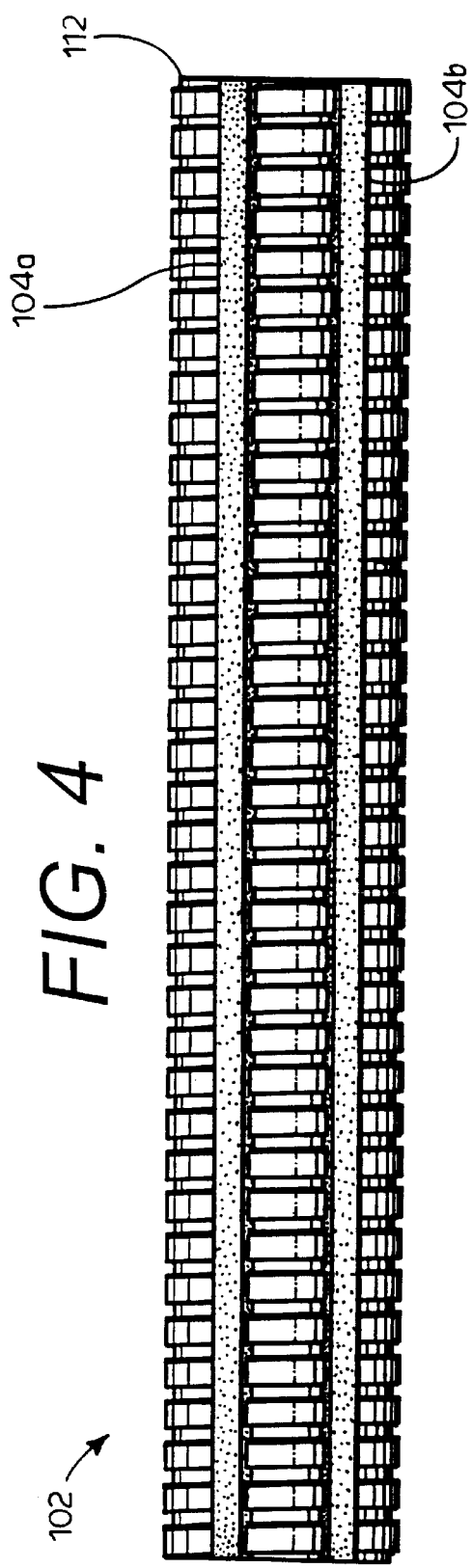
FIG. 4 is a side elevational view of a length-controlled flexible metal hose comprising a first modified embodiment of the present invention with a pair of longitudinally-extending, parallel length control strips.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 2 generally designates a flexible hose with an adhesive length control strip 4 embodying the present invention. Without limitation on the generality of useful applications of the length-controlled hose 2, it is shown installed in an exhaust system 3 between first and second components 6a,b each having a component pipe 8a,b respectively. Each pipe 8a,b has an end 10a,b. The pipe ends 10a,b are spaced apart a predetermined design distance D.1. The design distance D.1 between the pipe ends 10a,b, plus the overlap lengths L.1 and L.2 equals a total length L.3, which is designated the engineered length of the hose section 2.

The first component 6a can comprise, for example, an internal combustion engine with the first pipe 8a comprising an exhaust manifold and the second component 6b comprising a muffler with the second pipe 8b comprising an exhaust pipe. The pipes 8a,b can be aligned longitudinally, oriented at right angles, oriented in parallel relation or configured in a wide variety of other, alternative orientations with respect to each other. The hose 2, being flexible, is designed to bend in various configurations, including U-shaped 180° bends, to accommodate various alignments and configurations of the component pipes 8a,b. In operation, the hose 2 accommodates relative movement between the components 6, such as vibration associated with the operation of an internal combustion engine and relative movement associated with over-the-road truck travel. The flexible hose 2 is attached to the manifold 8a and the exhaust pipe 8b by suitable fastening means, such as band clamps 11, as shown, or by some other suitable fastening means, such as weldments, exhaust pipe clamps, etc.

II. Length-Controlled Flexible Hose 2

The hose 2 includes a body 12 with first and second ends 14a,b and first and second end sections 16a,b adjacent to the ends 14a,b respectively. The body 12 includes an inner surface 18a which defines a bore 20 extending between the body ends 14a,b. The body 12 is formed by spiral-winding a continuous metal band 22 and interlocking leading and trailing edges 24a,b thereof. This technique for forming spiral-wound metal hose is disclosed in the McGowen U.S. Pat. No. 4,197,728, which is incorporated herein by reference. The interlocked edges 24a,b are adapted to slide or shift relative to each other whereby the resulting hose body 12 is flexible.

The length control strip 4 extends longitudinally on the body outer surface 18b and includes control strip first and second ends 26a,b which are generally flush with the body first and second ends 14a,b. The control strip 4 can comprise a strip of adhesive, e.g., hot-melt adhesive, applied continuously to lengths of flexible hose 2. For example, the adhesive control strip 4 can be applied in a manufacturing operation located downstream from the equipment for winding the flexible hose body 12. By placing the control strip 26 on the body 12 in a liquid phase and allowing it to cool, harden or dry to a solid phase, adhesive spacers 28 are formed between the interlocked edges 24a,b. The spacers 28 extend into a helical channel 30 formed at the body outer surface 18b between the interlocked band edges 24a,b.

In operation, the control strip 4 maintains a predetermined spacing between the band edges 24a,b within the channel 30. Thus, the hose section 2 can retain a certain amount of flexibility, but the total engineered length L.3 thereof will be maintained along the control strip 4. The control strip 4 can either be permanent or removable as required in particular applications.

III. First Modified Embodiment Length-Controlled Flexible Hose Section 102

A flexible hose 102 comprising a first modified embodiment of the present invention is shown in FIG. 4 and includes first and second length control strips 104a,b extending in generally parallel, spaced relation along a body 112. The use of multiple length control strips 104a,b can provide a greater degree of length control than a single strip. The number, radial placement and orientation (i.e., longitudinal, helical, etc.) of the length control strips 104a,b can vary to suit the requirements of particular applications.

IV. Second Modified Embodiment Length-Controlled Flexible Hose 202

Figure 5:
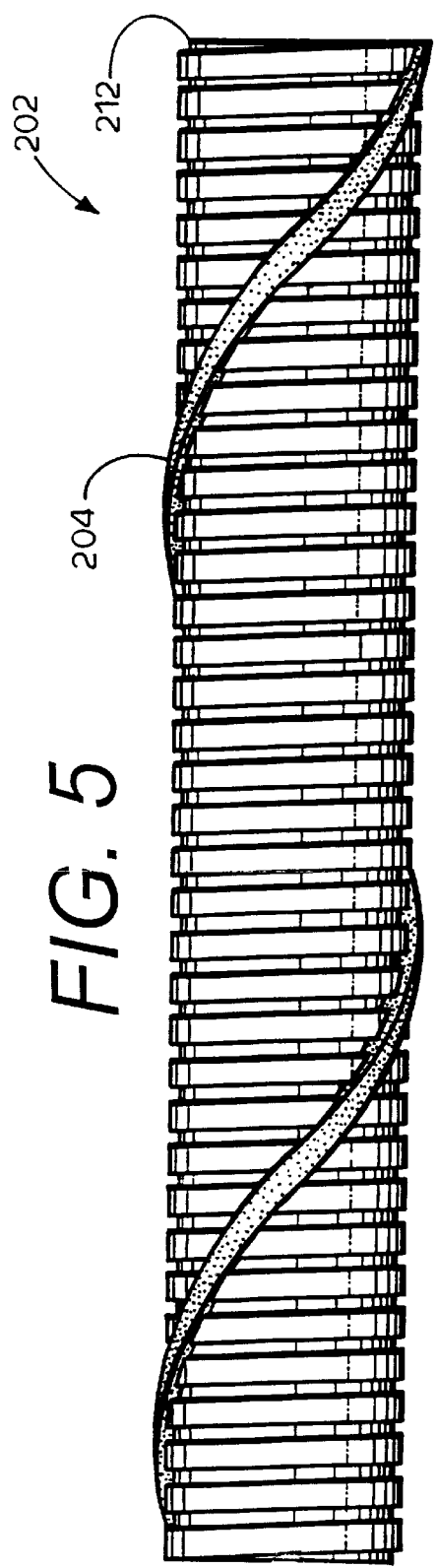
FIG. 5 is a side elevational view of a length-controlled flexible metal hose comprising a second modified embodiment of the present invention with a spiral-wound or helical length control strip.

FIG. 5 shows a flexible hose 202 with a spiral-wound or helical length-control adhesive strip 204 applied to a flexible hose body 212. The length control strip 204 can be applied in a molten, liquid phase by passing the flexible hose body 212 through appropriate equipment, which can rotate the hose body 212 while the adhesive strip 204 is being applied whereby the latter assumes a helical configuration. The number of helical control strips 204, and their configurations, can vary according to the requirements of particular applications.

V. Third Modified Embodiment Length-Controlled Flexible Hose 302

FIG. 6 shows a length-controlled flexible hose 302 comprising a third modified embodiment of the present invention and including a flexible hose body 312 with a body medial section 312a and a body end section 316a terminating at a body end 314a.

A spiral-wound band 322 forms the body 312 and is wound with a channel 330 having a medium width W.1 at the body medial section 312a and a relatively narrow width W.2 at the body end section 316a. The band 322 is thus relatively tightly wound at the body end section 316a, and is more loosely wound at the body medial section 312a. A length-control adhesive strip 304 extends along the body medial section 312a on a body outer surface 318b and terminates at a length control strip end 326 located at a transition between the body medial and end sections 312a, 316a.

The flexible hose body 312 lends itself to applications where the adhesive strip 304 can be used to provide length control for the body medial section 312a, as described above, and the body end section 316a can be either compressed or expanded for various purposes in the use of the flexible hose section 302. For example, with the end section 316a compressed, a greater degree of support can be provided at a connection to a system component, such as the first and second components 6a,b. The tighter windings of the band 322 and the narrower channel 330 at the body end section 316a provide greater contact areas for the band leading and trailing edges 324a,b, thereby reducing the possibility of leaks.

Still further, the body end section 316a can be used to adjust the length of the flexible hose 302 in the field. For example, the body end 314a could be grasped and pulled outwardly to increase the hose section length. The other end of the flexible hose section 302 could have a similar configuration, i.e. tighter winding of the band 322 and narrower channel 330.

VI. Fourth Modified Embodiment Length-Controlled Flexible Hose 402

FIG. 7 shows a length-controlled flexible hose 402 comprising a fourth modified embodiment of the present invention. The flexible hose 402 includes a body 412 which is generally similar to the body 312 described above in connection with the third modified embodiment and includes a body medial section 412a whereat a channel 430 has a medium width W.1 and a body end section 416a whereat the channel 430 has a relatively narrow width. W.2 The fourth modified embodiment flexible hose section 402 includes a length-control adhesive strip 404 which extends along the medial section 412a and the end section 416a. The length control strip 404 thus functions to maintain a predetermined (i.e. engineered) length along the entire flexible hose body 412. One or both ends of the flexible hose body 412 could be provided with a compressed end section, such as that shown at 416a, and the length-control adhesive strip 404 overlying same.

VII. Fifth Modified Embodiment Length-Controlled Flexible Hose 502

FIG. 8 shows a length-controlled flexible hose 502 comprising a fifth modified embodiment of the present invention. The flexible hose 502 includes a body 512 with a longitudinally extending bore 520. A length-control adhesive strip 504 is placed on the body 512 within the bore 520. The adhesive strip 504 can extend longitudinally with respect to the body 512 as shown, or can assume some other configuration. The adhesive strip 504 can terminate at end sections of the flexible hose 502 in a manner similar to the third modified embodiment shown in FIG. 6. The flexible hose end sections can thus receive pipes, such as the manifold 8a and the exhaust pipe 8b without interference from the adhesive strip 504.

VIII. Operation

In operation, the length-controlled flexible hoses 2, 102, 202, 302, 402 and 502 are designed to assist in maintaining a design length for the flexible metal hose, e.g., between first and second components 6a,b. The hoses are thus relatively impact-resistant whereby their respective lengths are relatively unaffected by various forces which may be encountered in shipping, handling and installation.

The length control strips, 4, 104, 204, 304, 404 and 504 can comprise a suitable material, such as, for example, hot-melt adhesive. The adhesive can be color-coated to designate a temperature range for the hoses 2, 102, 202, 302, 402 and 502 or to designate the metallic alloys comprising same. The strips 4, 104, 204, 304, 404 and 504 can also be removable. For example, it may be advantageous to install the hoses 2, 102, 202, 302, 402 and 502 with predetermined design or engineered lengths, and after installation to remove the adhesive strips whereby the hoses would have greater freedom to expand and contract longitudinally in reaction to conditions in the field.

It is to be understood that while certain forms of the present invention have been illustrated and described herein, it is not to be limited to the specific forms or arrangement of parts described and shown.

IX. Sixth Modified Embodiment Length-Controlled Flexible Hose 602

Figure 9:
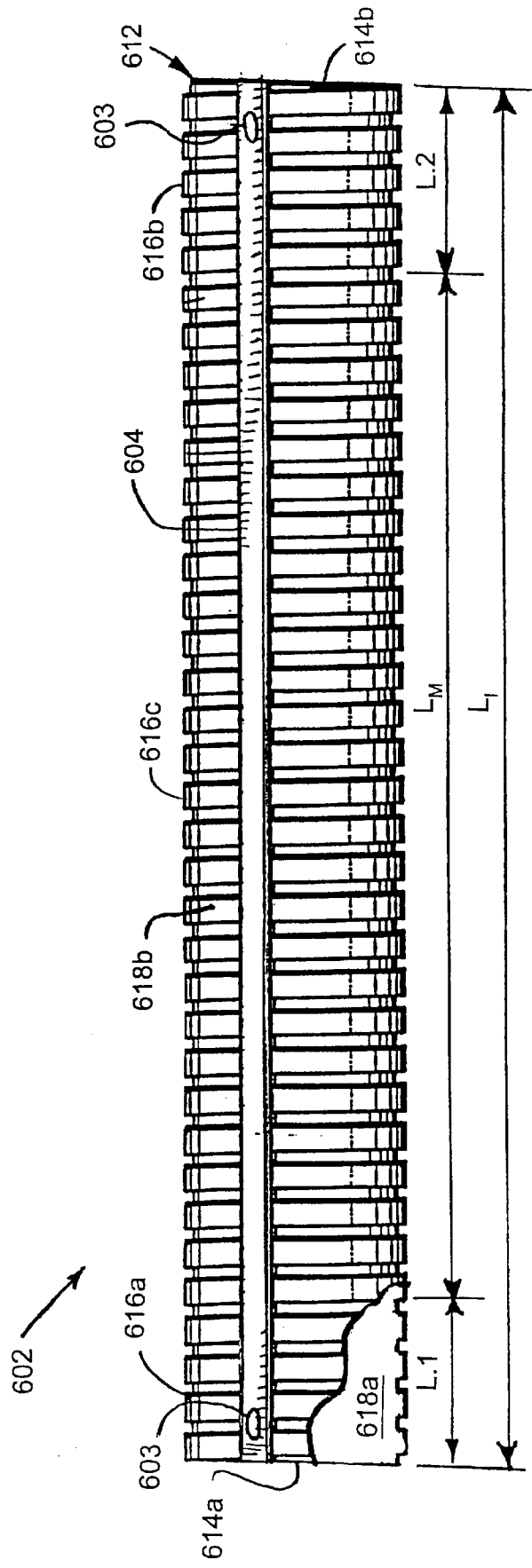
FIG. 9 is a side elevational view of a length-controlled flexible metal hose comprising a sixth modified embodiment of the present invention.

FIG. 9 shows a length-controlled flexible hose 602 comprising a sixth modified embodiment of the present invention. The flexible hose 602 is shown in a compressed configuration with a manufactured length $L_M$. However, the manufactured length $L_M$ could also comprise an extended length.

A length control strip 604 is placed on a body 612 of the flexible hose 602 and extends between first and second body ends 614a,b which are adjacent to body end sections 616a,b respectively. The length control strip 604 preferably has a suitable tensile strength for retaining the flexible hose 602 in its compressed configuration. The length control strip 604 is designed for release from the body 612. For example, the length control strip 604 can comprise a metallic member, such as a strip or band of sheet metal, a flat stock steel member, a cable, a chain, or any other suitable structure comprising any suitable material. An advantage of using a metal length control strip 604 is that it can be tacked or welded by spot welds 603 to an inner or outer surface 618a,b of the flexible hose 602. The length control strip 604 can be attached with various other suitable attachment means, including, without limitation, mechanical fasteners (e.g. screws, bolts, rivets, etc.) and adhesives. By way of further example, the length control strip 604 could comprise a thermoplastic material adapted to melt when subjected to heat, thus allowing the flexible hose 602 to expand upon release from its manufactured length $L_M$ to its installed length $L_I$. The length control strip 604 can be fastened only to the body end sections 616a,b whereby a body medial section 616c can be unattached.

Separation of the length control strip 604 from the flexible hose body 612 can be accomplished in various ways. For example, attachments such as spot welds can simply be popped loose with a suitable prying instrument, such as a screwdriver or pry bar. Alternatively, the length control strip 604 could be attached at its ends and severed therebetween, thus releasing the secured ends of the length control strip 604 and thereby allowing the flexible hose 602 to assume its installed length $L_I$. The installed length $L_I$ can correspond to the length L.3 shown in FIG. 1 and discussed above in connection therewith. The manufactured length $L_M$ can correspond to the distance D.1 shown in FIG. 1 with the length-controlled flexible hose 602 used in an exhaust system 3 application. The flexible hose 602 can extend by incremental lengths corresponding to L.1 and L.2 (FIG. 1) when the length control strip 604 is severed and/or removed to release the ends 614*a,b*.

X. Exhaust System Component Connection Method

Figure 10:
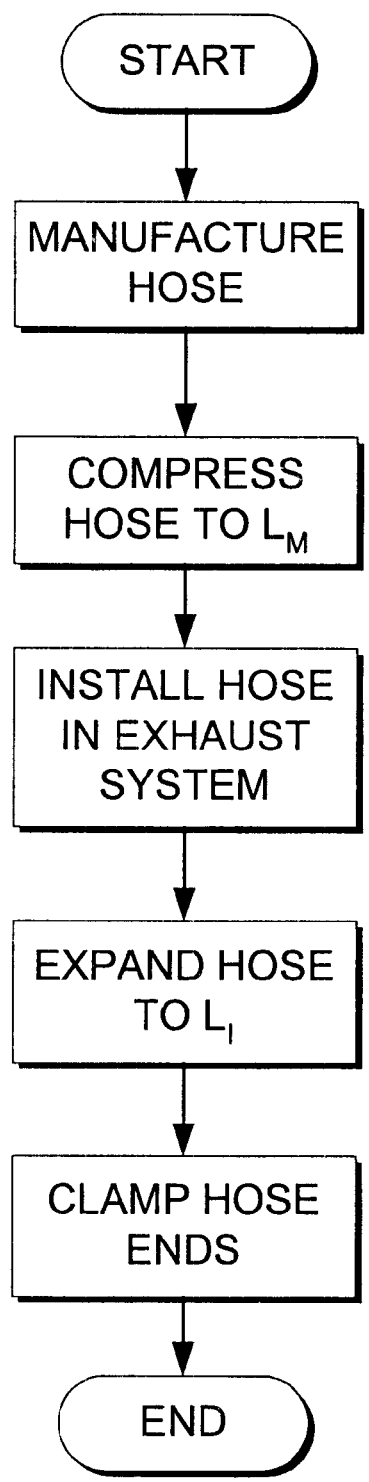
FIG. 10 is a flow chart of an exhaust system component connection method embodying the present invention.

FIG. 10 is a flow chart of an exhaust system component connection method embodying the present invention. Without limitation on the generality of useful applications of the method, it can be practiced on any of a variety of systems wherein it is desired to fluidically connect components with flexible hose.

What is claimed is:

1. A flexible hose, which includes:
   (a) a spiral-wound continuous metal band with interlocked leading and trailing edges;
   (b) first and second ends;
   (c) first and second end sections each located adjacent to a respective end;
   (d) a medial section between said end sections;
   (e) inner and outer surfaces;
   (f) a bore extending longitudinally and coaxially between said ends and open thereat;
   (g) a length control strip comprising a tensile and/or compressive member mounted on one of said surfaces and fastened thereto; and
   (h) means for at least partially releasing said length control strip from said one surface; wherein
   (i) said flexible hose is expandable from a manufactured length with said spiral-wound metal band compressed to an installed length with said spiral-wound continuous metal band expanded and said length control strip at least partially detached from said one surface.

2. The flexible hose according to claim 1, wherein said length control member comprises a metal tensile member.

3. The flexible hose according to claim 2, wherein said length control member comprises a strip attached to said end sections.

4. The flexible hose according to claim 3 wherein said length-control member is welded to said metal band.

5. The flexible hose according to claim 1, which includes:
   (a) said length control strip extending along said medial section and terminating at one or more of said end sections.

6. The flexible hose according to claim 1, which includes:
   (a) said length control strip extending along said medial and end sections between said flexible hose ends, said length control strip terminating at said flexible hose ends.

7. The flexible hose according to claim 1, which includes:
   (a) said length control strip being located on said inner surface within said flexible hose bore.

8. The flexible hose according to claim 1 wherein said length control strip is color-coded to correspond to a characteristic of said flexible hose.

9. In combination with an exhaust system including a manifold with a manifold end, an exhaust pipe with an exhaust pipe end and a predetermined design distance between said manifold and exhaust pipe ends, the improvement of a flexible hose which comprises:
   (a) a continuous, spiral-wound metal band with interlocked leading and trailing edges;
   (b) first and second ends;
   (c) first and second end sections located adjacent to said first and second ends respectively;
   (d) said end sections telescopically receiving said manifold and exhaust pipe ends;
   (e) first and second clamps clamping said first and second end sections to said manifold and exhaust pipe end sections;
   (f) inner and outer surfaces;
   (g) a bore formed by said inner surface, said bore extending between and being open at said ends; and
   (h) a length control member with a tensile or compressive strength extending along one of said surfaces and releasably attached thereto.

10. The flexible hose according to claim 9, which includes:
    (a) a manufactured length between said ends with said spiral-wound metal band in a compressed configuration; and
    (b) an installed length with said spiral-wound metal band in an expanded configuration, said installed length being greater than said manufactured length.

11. A method of connecting an exhaust manifold with a manifold end to an exhaust pipe with an exhaust pipe end in an exhaust system, which comprises the steps of:
    (a) spiral-winding a continuous metal band with leading and trailing edges;
    (b) interlocking the band leading and trailing edges;
    (c) providing first and second ends of said flexible hose;
    (d) providing first and second end sections adjacent said first and second ends of said flexible hose;
    (e) providing said flexible hose with a manufactured length with said spiral-wound metal band in a compressed configuration;
    (f) providing a longitudinally-extending tensile member;
    (g) releasably attaching said tensile member to said first and second end sections;
    (h) telescopically receiving one of said exhaust system ends in one of said flexible hose ends;
    (i) releasing said length control strip;
    (j) expanding said flexible hose to an installed length greater than said manufactured length;
    (k) telescopically receiving the other exhaust system end in said second flexible hose end; and
    (l) clamping said first and second flexible hose ends to said exhaust system ends.

* * * * *